United States Patent Office 3,468,882
Patented Sept. 23, 1969

3,468,882
PHENYLHYDRAZONE DERIVATIVES AS INTERMEDIATES FOR PREPARING INDOLES
Stanley C. Laskowski, East Greenbush, N.Y., assignor to Sterling Drug Inc., New York, N.Y., a corporation of Delaware
No Drawing. Filed Oct. 7, 1966, Ser. No. 584,956
Int. Cl. C07d 51/72, 57/00; A61k 27/00
U.S. Cl. 260—240
16 Claims

ABSTRACT OF THE DISCLOSURE

New ω-[4-substituted-1-piperazinyl]lower-alkyl ketone and aldehyde phenylhydrazones useful as intermediates for preparing 1-[(3-indolyl)-lower-alkyl]-4-substituted-piperazines.

This invention relates to certain intermediates and a process for preparing 1-[(3-indolyl)-lower-alkyl]-4-substituted-piperazines of the formula

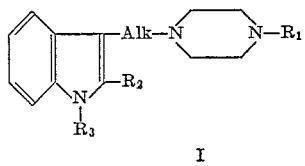

I where Alk is lower-alkylene, and $R_1$, $R_2$, and $R_3$ are organic groups whose nature generally are immaterial, provided they are inert to ketone-reactive agents, like phenylhydrazine. Thus, without limitation thereto, $R_1$ can be lower-alkyl, hydroxy-lower-alkyl, phenyl, phenyl-lower-alkyl, benzhydryl, cinnamyl, cycloalkyl, cycloalkyl-lower-alkyl, piperidyl, pyrrolidyl, morpholinyl-lower-alkyl, di-lower-alkylamino-lower-alkyl, pyrimidyl, pyrazinyl, pyridyl, thiazolyl, 1,3,5-triazinyl, or thienyl; $R_2$ can be hydrogen, lower-alkyl, or phenyl; and $R_3$ can be hydrogen, lower-alkyl, or phenyl-lower-alkyl.

As used herein, the terms lower-alkyl and lower-alkylene mean lower-alkyl or lower-alkylene containing from one to seven carbon atoms which can be either straight or branched. Thus when $R_1$, $R_2$, or $R_3$ represent lower-alkyl, they can be methyl, ethyl, n-propyl, isopropyl, isobutyl, n-hexyl, and the like, and Alk, as lower-alkylene, can be methylene, 1,2-ethylene, 1,3-propylene, 2-methylbutylene, 2-ethylpentylene, 1,7-heptylene, and the like.

As used herein, the term cycloalkyl means cycloalkyl containing from three to seven carbon atoms, and thus when $R_1$ represents cycloalkyl or cycloalkyl-lower-alkyl, it represents cyclopropyl, cyclopropylmethyl, cyclobutyl, cyclopentyl, cyclohexyl, cyclohexylmethyl, 2-cyclohexylethyl, and the like.

In the above general Formula I, when $R_1$, $R_2$, or $R_3$ is phenyl, or when $R_1$ is benzhydryl, or cinnamyl, the benzene ring thereof can bear one or more substituents of low molecular weight and of such nature that they do not interfere with or take part in the reactions, to be described hereinafter, used in the preparation of the compounds. Moreover, the benzene ring of the indole nucleus can also be further substituted in any of the available positions thereof by such substituents. Examples of such substituents include halogen, lower-alkyl, lower-alkoxy, lower-alkylmercapto, lower-alkylsulfinyl, lower-alkylsulfonyl, nitro, trifluoromethyl, methylenedioxy, ethylenedioxy, carbo-lower-alkoxy, benzyloxy, benzyl, sulfamyl, amino, lower-alkanoyl-amino, lower-alkoxycarbonylamino, lower-alkanoyloxy, hydroxy, and the like. It will be understood that compounds bearing such substituents are the full equivalents of the unsubstituted compounds and are within the purview of the invention.

Some of the compounds of Formula I above are disclosed and claimed in U.S. Patent 3,188,313. All of the compounds of Formula I, whether disclosed and claimed in U.S. Patent 3,188,313 or disclosed and claimed herein are very valuable compounds having antiviral and anti-inflammatory activities as well as depressant action on the central and autonomic nervous systems, the cardiovascular system, and the skeletal muscular system, and more specifically possess antiviral, anti-inflammatory, adrenolytic, cardiac depressant, hypotensive, anti-emetic, hypothermic, sedative, tranquilizer, and skeletal muscle relaxant properties.

A number of processes for preparing the compounds of Formula I are disclosed in U.S. Patent 3,188,313, which include alkylation of a 1-substituted-piperazine with a (3-indolyl)-lower-alkyl halide; Mannich reaction of an indole, a 1-substituted-piperazine, and formaldehyde (to prepare the compounds of Formula I where Alk is methylene); and a number of methods involving reduction of an oxo function, either in the side chain represented by Alk or in the piperazine ring. With the possible exception of the Mannich reaction, which is limited in usefulness to the preparation of compounds where Alk is methylene, each of the above-described processes suffers from one or more of several disadvantages. For example, each of the previous methods requires several synthetic steps for the preparation of the final products, since the procedures require the use of starting materials or intermediates which are not always readily available. Also many of the known methods require, as reducing agent, alkali metal aluminum hydrides which are rather expensive reducing agents and which furthermore are not readily adaptable to large-scale commercial use. It has also been found that products prepared on a large scale by methods involving use of an alkali metal aluminum hydride may be contaminated with a very stubborn impurity which resists removal by conventional purification procedures.

It has now been found that the compounds of Formula I can be prepared economically, in excellent yield, and in a high state of purity by essentially a one-step reaction involving cyclization under acid conditions of an ω-[4-substituted-1-piperazinyl]-lower-alkanaldehyde phenylhydrazone, ω-[4-substituted-1-piperazinyl]-lower-alkyl lower-alkyl ketone phenylhydrazone, or ω-[4-substituted-1-piperazinyl]-lower-alkyl phenyl ketone phenyl-hydrazone of the formula:

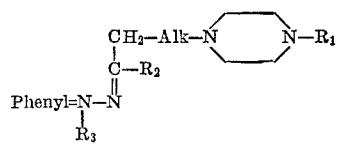

II where $R_1$, $R_2$, $R_3$, and Alk have the meanings given above, and phenyl represents the precursor of the benzenoid ring of the indole nucleus in the products of Formula I. It will thus be appreciated that the compounds of Formula II above can be substituted in the phenyl ring by one or more substituents of the nature described above.

According to the process of the present invention, the compounds of Formula I are prepared from the compounds of Formula II by heating the latter in the presence of an acid, for example hydrochloric acid, sulfuric acid, p-toluenesulfonic acid, glacial acetic acid, and the like, and in an organic solvent inert under the conditions of the reaction, for example methanol, ethanol, isopropanol, benzene, toluene, and the like. When glacial acetic acid is used as the acid condensing agent, it can also be used in excess as the solvent medium as well.

The reaction is represented by the equation:

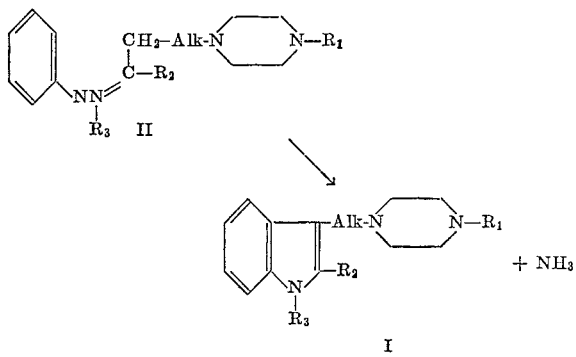

The hydrazones of Formula II in turn are prepared by reacting a phenylhydrazine of Formula III with an ω-(4-substituted-1-piperazinyl)aldehyde, an ω-(4-substituted-1-piperazinyl)-lower-alkanone, or an ω-(4-substituted-1-piperazinyl)-lower-alkyl phenyl ketone of Formula IV where $R_2$ is hydrogen, lower-alkyl, or phenyl, respectively. The reaction is represented by the equation:

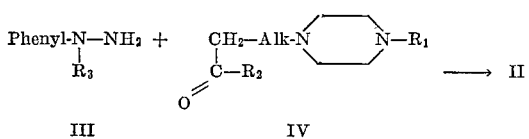

and generally takes place at room temperature. Like the cyclization of the hydrazones of Formula II to the products of Formula I, the reaction is advantageously carried out in an organic solvent inert under the conditions of the reaction, for example methanol, ethanol, isopropanol, benzene, toluene, xylene, and the like, and in the presence of an acid, for example hydrochloric acid, sulfuric acid, p-toluenesulfonic acid, glacial acetic acid, and the like.

The hydrazones of Formula II thus formed can, if desired, be isolated from the reaction mixture before cyclizing to the indole final products. It is preferred to carry the reaction to completion, without isolating the intermediate hydrazones, by heating the reaction mixture containing the hydrazone which itself is formed at lower temperatures.

The novel compounds of the instant invention are the bases of Formulas I and II and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formulas I and II not only represent the structural configurations of the bases of the invention but each is also representative of the respective structural entity which is common to all of the respective compounds, whether in the form of the free bases or in the form of the acid-addition salts of the bases. It has been found that by virtue of this common structural entity, the bases of Formula I and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, it is preferred of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, the salts of the compounds of both Formulas I and II are useful as characterizing or identifying derivatives of the free bases or in isolation or purification procedures. Like all of the acid-addition salts, such characterizing or purification salt derivatives can, if desired, be used to regenerate the pharmaceutically-acceptable free bases, in the case of the compounds of Formula I, by reaction of the salts with aqueous base, or alternatively they can be converted to pharmaceutically-acceptable acid-addition salts by, for example, ion-exchange procedures.

It will be appreciated from the foregoing that all of the acid-addition salts of the new bases of Formulas I and II are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new indoles and hydrazones, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I according to standard pharmacological test procedures has demonstrated that they possess adrenolytic, hypotensive, cardiac depressant, psychomotor depressant, anti-inflammatory, hexobarbital potentiation, anti-emetic, hypothermic, skeletal muscle relaxant, and anti-viral activities thus indicating their usefulness as adrenolytic, hypotensive, cardiovascular, tranquilizer, sedative, anti-emetic, hypothermic, skeletal muscle relaxant, anti-inflammatory, and anti-viral agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

The chemical structures of the compounds of the invention are established by their mode of synthesis, by the structures of the final products obtained therefrom, which structures are corroborated by infrared and ultraviolet spectra, and by the correspondence in the products between calculated values for the elements and values found by chemical analysis.

The following examples will further illustrate specific embodiments of the invention without the latter being limited thereto.

Example 1.—1-(3-acetylpropyl)-4-phenylpiperazine

[IV: $R_1$ is $C_6H_5$; $R_2$ is $CH_3$; Alk is $CH_2CH_2$]

A mixture of 120.6 g. (1.0 mole) of 5-chloro-2-pentanone, 81 g. (0.5 mole) of 1-phenylpiperazine, 15.9 g. (1.5 mole) of anhydrous powdered sodium carbonate, and 260 ml. of xylene was heated and stirred on a steam bath for twenty-two hours, cooled, and filtered to remove insoluble inorganic salts. The filter was washed with ether, and the combined filtrate and washings were combined, and taken to dryness under reduced pressure and the residual oil distilled in vacuo giving 80.0 g. of 1-(3-acetylpropyl)-4-phenylpiperazine, B.P. 153–160° C./0.1–0.3 mm.;

$n_D^{25} = 1.5475$

Examples 2–16

The following compounds of Formula IV in Table 1 were prepared from 5-chloro-2-pentanone and an appropriate 1-substituted-piperazine using the manipulative procedure described above in Example 1. In each case, $R_2$ is $CH_3$, and Alk is $(CH_2)_2$. The melting points are uncorrected.

TABLE 1

| Example: | $R_1$ | Base or salt | M.P., ° C. |
|---|---|---|---|
| 2 | 2-ClC$_6$H$_4$ | HCl | 184–185 |
| 3 | 2-CH$_3$OC$_6$H$_4$ | HCl | 198.5–200 |
| 4 | 4-CH$_3$OC$_6$H$_4$ | HCl | 224–226 |
| 5 | 3,4-di-(CH$_3$O)$_2$C$_6$H$_3$ | HCl | 203–205 |
| 6 | 3-ClC$_6$H$_4$ | HCl | 168–174 |
| 7 | 4-C$_2$H$_5$O$_2$CC$_6$H$_4$ | HCl | 190–192 |
| 8 | 2-CH$_3$-3-ClC$_6$H$_3$ | HCl | 210–214 |
| 9 | 4-ClC$_6$H$_4$ | HCl | 183–185 |
| 10 | 3-CF$_3$C$_6$H$_4$ | HCl | 182–184 |
| 11 | 3-CH$_3$C$_6$H$_4$ | HCl | 65–67 |
| 12 | 2,4,6-(CH$_3$)$_3$C$_6$H$_2$ | HCl | 178–179.5 |
| 13 | 2,4-di-(CH$_3$O)$_2$-5ClC$_6$H$_2$ | HCl | 186–189 |
| 14 | 4-CH$_3$C$_6$H$_4$ | HCl | 210–215 |
| 15 | 4-FC$_6$H$_4$ | HCl | 200–202 |
| 16 | C$_6$H$_5$CH$_2$ | HCl | 260–261 |

Examples 17–70

By reacting an appropriate ω-halo-lower-alkanaldehyde ($R_2$ is hydrogen), ω-halo-lower-alkanone ($R_2$ is lower-alkyl), or ω-halo-lower-alkyl phenyl ketone ($R_2$ is phenyl) with an appropriate 1-substituted-piperazine in the presence of anhydrous sodium carbonate following the manipulative procedure described above in Example 1, there are obtained the compounds of Formula IV listed below in Table 2.

TABLE 2

| Example: | $R_1$ | $R_2$ | Alk |
|---|---|---|---|
| 17 | C$_6$H$_5$ | H | CH$_2$ |
| 18 | C$_6$H$_{11}$ | H | (CH$_2$)$_2$ |
| 19 | C$_6$H$_{11}$ | H | (CH$_2$)$_3$ |
| 20 | 4-C$_5$H$_9$N-CH$_3$ | H | (CH$_2$)$_4$ |
| 21 | 4-C$_5$H$_9$N-CH$_3$ | H | (CH$_2$)$_3$ |
| 22 | 2,6-(CH$_3$O)$_2$C$_6$H$_3$ | CH$_3$ | (CH$_2$)$_2$ |
| 23 | C$_6$H$_5$ | H | CH(CH$_3$)CH$_2$ |
| 24 | 4-ClC$_6$H$_4$ | H | (CH$_2$)$_2$ |
| 25 | C$_6$H$_5$CH=CHCH$_2$ | H | (CH$_2$)$_2$ |
| 26 | 4-CH$_3$C$_6$H$_4$ | H | (CH$_2$)$_2$ |
| 27 | C$_6$H$_5$ | H | (CH)$_{22}$ |
| 28 | C$_6$H$_5$CH$_2$CH$_2$ | H | (CH$_2$)$_2$ |
| 29 | 3-Cl-4-CH$_3$C$_6$H$_3$ | H | (CH$_2$)$_2$ |
| 30 | 4-CH$_3$OC$_6$H$_4$ | H | (CH$_2$)$_2$ |
| 31 | 3-CH$_3$C$_6$H$_4$ | H | (CH$_2$)$_2$ |
| 32 | 2-CH$_3$C$_6$H$_4$ | H | (CH$_2$)$_2$ |
| 33 | 2-CH$_3$OC$_6$H$_4$ | H | (CH$_2$)$_2$ |
| 34 | 4-CH$_3$OC$_6$H$_4$ | H | (CH$_2$)$_2$ |
| 35 | CH$_3$ | H | (CH$_2$)$_2$ |
| 36 | HOCH$_2$CH$_2$ | H | (CH$_2$)$_2$ |
| 37 | 4-CH$_3$SC$_6$H$_4$ | H | (CH$_2$)$_2$ |
| 38 | 3-CH$_3$OC$_6$H$_4$ | H | (CH$_2$)$_2$ |
| 39 | C$_6$H$_5$ | H | (CH$_2$)$_4$ |
| 40 | C$_6$H$_5$CH$_2$ | H | (CH$_2$)$_2$ |
| 41 | 2-C$_5$H$_4$N | H | (CH$_2$)$_2$ |
| 42 | 2-C$_2$H$_5$OC$_6$H$_4$ | H | (CH$_2$)$_2$ |
| 43 | 2-CH$_3$OC$_6$H$_4$ | H | (CH$_2$)$_4$ |
| 44 | 2-ClC$_6$H$_4$ | H | (CH$_2$)$_2$ |
| 45 | 2-CH$_3$-5-ClC$_6$H$_3$ | H | (CH$_2$)$_2$ |
| 46 | 2,6-(CH$_3$)$_2$C$_6$H$_3$ | H | (CH$_2$)$_2$ |
| 47 | 2-CH$_3$C$_6$H$_4$ | H | (CH$_2$)$_2$ |
| 48 | 2-ClC$_6$H$_4$ | H | (CH$_2$)$_3$ |
| 49 | 3-ClC$_6$H$_4$ | H | (CH$_2$)$_2$ |
| 50 | 3-CH$_3$OC$_6$H$_4$ | H | (CH$_2$)$_4$ |
| 51 | 2-CH$_3$OC$_6$H$_4$ | H | (CH$_2$)$_4$ |
| 52 | C$_6$H$_5$ | C$_6$H$_5$ | (CH$_2$)$_2$ |
| 53 | 2-CH$_3$C$_6$H$_4$ | CH$_3$ | (CH$_2$)$_2$ |
| 54 | 2-C$_4$H$_9$OC$_6$H$_4$ | H | (CH$_2$)$_2$ |
| 55 | 3-CH$_3$OC$_6$H$_4$ | CH$_3$ | (CH$_2$)$_2$ |
| 56 | C$_6$H$_5$ | C$_2$H$_5$ | (CH$_2$)$_2$ |
| 57 | 2-C$_2$H$_5$C$_6$H$_4$ | H | (CH$_2$)$_2$ |
| 58 | 2,5-(CH$_3$O)$_2$C$_6$H$_3$ | H | (CH$_2$)$_2$ |
| 59 | 2-pyrimidyl | H | (CH$_2$)$_2$ |
| 60 | 2-CH$_3$SC$_6$H$_4$ | H | (CH$_2$)$_2$ |
| 61 | 3-CH$_3$OC$_6$H$_4$ | H | (CH$_2$)$_3$ |
| 62 | C$_6$H$_5$ | CH$_3$ | (CH$_2$)$_2$ |
| 63 | 4HOC$_6$H$_4$ | CH$_3$ | (CH$_2$)$_2$ |
| 64 | CH$_3$ | H | CH$_2$ |
| 65 | (C$_6$H$_5$)$_2$CH | CH$_3$ | CH$_2$CH$_2$ |
| 66 | 2-pyrazinyl | CH$_3$ | CH$_2$CH$_2$ |
| 67 | 2-thiazolyl | CH$_3$ | CH$_2$CH$_2$ |
| 68 | 2-(1,3,5-triazinyl) | CH$_3$ | CH$_2$CH$_2$ |
| 69 | 2-thienyl | CH$_3$ | CH$_2$CH$_2$ |
| 70 | Cyclohexylmethyl | CH$_3$ | CH$_2$CH$_2$ |

Example 71.—1-[2-(5,6-dimethoxy-2-methyl-3-indolyl)ethyl]-4-phenylpiperazine

[I: $R_1$ is $C_6H_5$; $R_2$ is $CH_3$; Indole substituent is 5,6-di-$CH_3O$; $R_3$ is H; Alk is $CH_2CH_2$]

To a stirred refluxing mixture of 239 g. (1.17 moles) of 3,4-dimethoxyphenylhydrazine was added, in a fine stream over a period of twenty minutes, 288 g. (1.17 moles) of 1-(3-acetylpropyl)-4-phenylpiperazine. The mixture was then treated over a period of thiry minutes with 181 ml. of 6.49 N alcoholic hydrogen chloride, and stirred and heated under reflux for four hours. On cooling, the precipitated product was collected by filtration, washed first with a little isopropanol, and then with n-pentane. The crude product thus obtained upon drying (486 g.) was suspended in a mixture of 1.5 liters of chloroform, 1 liter of water, and 30 ml. of aqueous sodium hydroxide. The layers were separated and the organic layer washed with three 500 ml. portions of water, dried over anhydrous sodium sulfate, and taken to dryness in vacuo. The residual syrup (425 g.) was recrystallized from methanol giving two crops totaling 295.5 g. of 1-[2 - (5,6-dimethoxy - 2 - methyl-3-indolyl)ethyl]-4-phenylpiperazine, M.P. 139–141° C.

Examples 72–117

The following compounds of Formula I in Table 3 below were prepared from an appropriate 1-(3-acetylpropyl)-4-substituted-piperazine and an appropriate substituted-phenylhydrazine using the manipulative procedure described above in Example 71. In each instance, $R_2$ is $CH_3$, $R_3$ is H, and Alk is $CH_2CH_2$. The melting points are corrected.

TABLE 3

| Example: | $R_1$ | Indole substit. | Base or salt | M.P., °C. |
|---|---|---|---|---|
| 72 | $C_6H_5$ | H | HCl | 269.0–270.6 |
| 73 | 2-ClC$_6$H$_4$ | H | HCl | 276.4–278.8 |
| 74 | 2-CH$_3$OC$_6$H$_4$ | H | 2 HCl | 245.6–246.4 |
| 75 | $C_6H_5$ | 5-COOC$_2$H$_5$ | Base | |
| 76 | 4-CH$_3$OC$_6$H$_4$ | H | ....do.... | |
| 77 | 3,4-(CH$_3$O)$_2$C$_6$H$_3$ | H | ....do.... | 155.0–156.0 |
| 78 | $C_6H_5$ | 5-Cl | HCl | 272.0–273.8 |
| 79 | 3-ClC$_6$H$_4$ | H | HCl | 254.8–255.2 |
| 80 | 4-C$_2$H$_5$O$_2$CC$_6$H$_4$ | H | HCl | 239.5–241.0 |
| 81 | $C_6H_5$ | 6-Cl-7-CH$_3$ | 2 HCl | 279.0–280.0 |
| 82 | $C_6H_5$ | 5-CH$_3$CONH | Base | 207.0–210.0 |
| 83 | 2-CH$_3$OC$_6$H$_4$ | 5-Cl | ....do.... | |
| 84 | 2-CH$_3$-3-ClC$_6$H$_3$ | H | HCl | 280.0–281.0 |
| 85 | 4-ClC$_6$H$_4$ | H | HCl | 278.0–280.0 |
| 86 | 4-ClC$_6$H$_4$ | 5-Cl | Base | |
| 87 | 4-CH$_3$OC$_6$H$_4$ | H | 2 HCl | 250.5–254.0 |
| 88 | 3-CF$_3$C$_6$H$_4$ | H | HCl | 258.0–259.0 |
| 89 | $C_6H_5$ | 5-F | 2 HCl | 195–197.0 |
| 90 | 4-ClC$_6$H$_4$ | 5-F | HCl | 276.6–277.0 |
| 91 | 3-CF$_3$C$_6$H$_4$ | 5-F | HCl | 258.5–260.0 |
| 92 | 2-CH$_3$OC$_6$H$_4$ | 5-CH$_3$CONH | Base | |
| 93 | 4-ClC$_6$H$_4$ | 5-CH$_3$CONH | ....do.... | 101.0–103.0 |
| 94 | $C_6H_5$ | 5-CH$_3$O | ....do.... | |
| 95 | $C_6H_5$ | 7-Cl | ....do.... | |
| 96 | $C_6H_5$ | 5-CH$_3$ | HCl | 266.0–267.0 |
| 97 | 3-CH$_3$C$_6$H$_4$ | H | Base | 121.6–123.0 |
| 98 | 4-ClC$_6$H$_4$ | 5-CH$_3$ | HCl | 275.0–275.6 |
| 99 | 3-ClC$_6$H$_4$ | 5-F | HCl | 251.0–252.0 |
| 100 | 2-CH$_3$-3-ClC$_6$H$_3$ | 5-F | Base | |
| 101 | 3-CH$_3$C$_6$H$_4$ | 5,6-di-CH$_3$O | 2 HCl | 210.2–213.8 |
| 102 | 2,4,6-(CH$_3$)$_3$C$_6$H$_2$ | H | Base | 134.2–135.6 |
| 103 | 3-CH$_3$C$_6$H$_4$ | 5-CH$_3$ | ....do.... | 146.0–151.0 |
| 104 | 3-ClC$_6$H$_4$ | 5-CH$_3$CONH | ....do.... | 179.8–181.0 |
| 105 | 3-ClC$_6$H$_4$ | 5-CH$_3$ | ....do.... | 165.0–167.0 |
| 106 | 4-ClC$_6$H$_4$ | 5,6-di-CH$_3$O | ....do.... | 164.2–165.2 |
| 107 | 2,4-(CH$_3$O)$_2$-5-ClC$_6$H$_2$ | H | ....do.... | 155.6–156.8 |
| 108 | $C_6H_5$ | 7-CH$_3$ | ....do.... | |
| 109 | 4-CH$_3$C$_6$H$_4$ | H | ....do.... | 167.2–168.6 |
| 110 | 4-FC$_6$H$_4$ | H | ....do.... | 122.0–123.4 |
| 111 | 2-CH$_3$OC$_6$H$_4$ | 5,6-di-CH$_3$O | Hemi-ratartrate, hemi-hydrate | 208.0–209.8 |
| 112 | 2-CH$_3$OC$_6$H$_4$ | 5,6-OCH$_2$O | Base | 137.0–143.0 |
| 113 | $C_6H_5$CH$_2$ | 5,6-di-CH$_3$O | 2 HCl | 232–233 |
| 114 | 4-FC$_6$H$_4$ | 5,6-di-CH$_3$O | HCl | 259.0–260.0 |

Example 115.—1-[2-(2-methyl-3-indolyl)ethyl]-4-(4-fluorophenyl)piperazine

[I: $R_1$ is 4-FC$_6$H$_4$; $R_2$ is CH$_3$; $R_3$ and Indole substituent are H; Alk is CH$_2$CH$_2$]

To a solution of 10.8 g. (0.1 mole) of phenylhydrazine and 200 ml. of isopropanol was added 30 g. (0.1 mole) of 1-(3-acetylpropyl)-4-(4 - fluorophenyl)piperazine at room temperature. The hydrazone which separated on scratching was collected and recrystallized once from methanol giving 19.5 g. of 3-[4 - (4 - fluorophenyl) - 1-piperazinyl]propyl methyl ketone phenylhydrazone, M.P. 223–224° C.

Analysis.—Calcd. for C$_{21}$H$_{28}$ClFN$_4$: Cl, 9.07; N, 14.32. Found: Cl, 9.07; N, 14.17.

The above hydrazone was refluxed overnight in 200 ml. of 4 N ethanolic hydrogen chloride, and the mixture was then cooled, diluted with 100 ml. of ether, and filtered. The solid filter was dissolved in 250 ml. of methanol, treated with 10% aqueous sodium hydroxide until basic, diluted with water to the cloud point, and cooled to induce crystallization. The solid which separated out was collected by filtration and recrystallized from methanol to give 8.5 g. of 1-[2-(2-methyl-3-indolyl)ethyl]-4-(4-fluorophenyl)piperazine, M.P. 122–123° C. Its mixed melting point with material obtained above in Example 110 was undepressed.

Example 116.—1-[2-(2-methyl-3-indolyl)ethyl]-4-(3-chlorophenyl)piperazine hydrochloride

[I: $R_1$ is 3-ClC$_6$H$_4$; $R_2$ is CH$_3$; $R_3$ and Indole substituent are H; Alk is CH$_2$CH$_2$]

Phenylhydrazine, (10.8 g., 0.1 mole) was reacted with 31.7 g. (0.1 mole) of 1-(3-acetylpropyl)-4-(3-chlorophenyl)piperazine in 100 ml. of warm isopropanol according to the manipulative procedure described above in Example 115. The intermediate hydrazone was recrystallized from methanol to give 20.5 g. of 3-[4-(3-chlorophenyl)-1-piperazinyl]propyl methyl ketone phenylhydrazone, M.P. 220–221° C. (uncorr.).

Analysis.—Calcd. for C$_{21}$H$_{28}$Cl$_2$N$_4$: C, 61.91; H, 6.92; Cl, 8.70. Found: C, 61.92; H, 6.96; Cl, 8.97.

The above hydrazone was heated under reflux in 200 ml. of 4 N ethanolic hydrogen chloride for four hours, and the reaction mixture was cooled and filtered. The crude material thus obtained was recrystallized from methanol giving 12.7 g. of 1-[2-(2-methyl - 3 - indolyl)ethyl]-4-(3-chlorophenyl)piperazine hydrochloride, M.P. 252–253° C. Its melting point with material obtained above in Example 79 was undepressed.

Example 117.—1-[2-(2-methyl-5,6-dimethoxy-3-indolyl)ethyl]-4-phenylpiperazine hydrochloride

[I: $R_1$ is C$_6$H$_5$; $R_2$ is CH$_3$; $R_3$ is H; Indole substituent is 5,6-di-CH$_3$O; Alk is CH$_2$CH$_2$]

A solution of 4 g. (0.02 mole) of 3,4-dimethoxyphenylhydrazine in water was mixed with an aqueous solution of 5.6 g. (0.02 mole) of 1-(3-acetylpropyl)-4-phenylpiperazine, and the combined solution was allowed to stand at room temperature for one hour.

The mixture was then rendered basic with sodium carbonate, extracted with ethyl acetate and the organic extracts dried and taken to dryness in vacuo. Recrystallization of the residue from ether afforded 0.7 g. of 3-(4-phenyl-1-piperazinyl)propyl methyl ketone 3,4 - dimethoxyphenylhydrazone, M.P. 123–127° C. (uncorr.).

The latter was dissolved in 2 ml. of 5 M ethanolic hydrochloric acid and refluxed on a steam bath for one hour. The solid which separated on cooling was collected and recrystallized from isopropanol to give 1-[2-(2-methyl-5,6-dimethoxy-3-indolyl)ethyl] - 4 - phenylpiperazine hydrochloride, identical in melting point, NMR and mixed melting point with the material obtained above in Example 71.

Examples 118–273

By reacting the appropriate phenylhydrazine of Formula III and the appropriate ω-(4-substituted-1-piperazinyl)-lower - alkanaldehyde, ω - (4 - substituted-1-piperazinyl)-lower-alkanone, or ω-(4-substituted-1-piperazinyl)-loweralkyl phenyl ketone of Formula IV under the conditions described in Examples 115–117, there can be obtained the ω - [4 - substituted-1-piperazinyl]-lower-alkanaldehyde phenylhydrazones, ω-[4-substituted-1-piperazinyl]-lower-alkyl lower-alkyl ketone phenylhydrazones, or ω-[4-substituted-1-piperazinyl]-lower-alkyl phenyl ketone phenylhydrazones of Formula II listed in Table 4 below, where $R_3$ in each instance is H.

TABLE 4

| Example: | $R_1$ | $R_2$ | Phenyl substit. | Alk |
|---|---|---|---|---|
| 118 | $C_6H_5$ | $CH_3$ | H | $CH_2CH_2$ |
| 119 | 2-$ClC_6H_4$ | $CH_3$ | H | $CH_2CH_2$ |
| 120 | 2-$CH_3OC_6H_4$ | $CH_3$ | H | $CH_2CH_2$ |
| 121 | $C_6H_5$ | $CH_3$ | 4-$COOC_2H_5$ | $CH_2CH_2$ |
| 122 | 4-$CH_3OC_6H_4$ | $CH_3$ | H | $CH_2CH_2$ |
| 123 | 3,4-$(CH_3O)_2C_6H_3$ | $CH_3$ | H | $CH_2CH_2$ |
| 124 | $C_6H_5$ | $CH_3$ | 4-Cl | $CH_2CH_2$ |
| 125 | 3-$ClC_6H_4$ | $CH_3$ | H | $CH_2CH_2$ |
| 126 | 4-$C_2H_5O_2CC_6H_4$ | $CH_3$ | H | $CH_2CH_2$ |
| 127 | $C_6H_5$ | $CH_3$ | 2-$CH_3$-3-Cl | $CH_2CH_2$ |
| 128 | $C_6H_5$ | $CH_3$ | 4-$CH_3CONH$ | $CH_2CH_2$ |
| 129 | 2-$CH_3OC_6H_4$ | $CH_3$ | 4-Cl | $CH_2CH_2$ |
| 130 | 2-$CH_3$-3-$ClC_6H_3$ | $CH_3$ | H | $CH_2CH_2$ |
| 131 | 4-$ClC_6H_4$ | $CH_3$ | H | $CH_2CH_2$ |
| 132 | 4-$ClC_6H_4$ | $CH_3$ | 4-Cl | $CH_2CH_2$ |
| 133 | 3-$CH_3OC_6H_4$ | $CH_3$ | H | $CH_2CH_2$ |
| 134 | 3-$CF_3C_6H_4$ | $CH_3$ | H | $CH_2CH_2$ |
| 135 | $C_6H_5$ | $CH_3$ | 4-F | $CH_2CH_2$ |
| 136 | 4-$ClC_6H_4$ | $CH_3$ | 4-F | $CH_2CH_2$ |
| 137 | 3-$CF_3C_6H_4$ | $CH_3$ | 4-F | $CH_2CH_2$ |
| 138 | 2-$CH_3OC_6H_4$ | $CH_3$ | 4-$CH_3CONH$ | $CH_2CH_2$ |
| 139 | 4-$ClC_6H_4$ | $CH_3$ | 4-$CH_3CONH$ | $CH_2CH_2$ |
| 140 | $C_6H_5$ | $CH_3$ | 4-$CH_3O$ | $CH_2CH_2$ |
| 141 | $C_6H_5$ | $CH_3$ | 2-Cl | $CH_2CH_2$ |
| 142 | $C_6H_5$ | $CH_3$ | 4-$CH_3$ | $CH_2CH_2$ |
| 143 | 3-$CH_3C_6H_4$ | $CH_3$ | H | $CH_2CH_2$ |
| 144 | 4-$ClC_6H_4$ | $CH_3$ | 4-$CH_3$ | $CH_2CH_2$ |
| 145 | 3-$ClC_6H_4$ | $CH_3$ | 4-F | $CH_2CH_2$ |
| 146 | 2-$CH_3$-3-$ClC_6H_3$ | $CH_3$ | 4-F | $CH_2CH_2$ |
| 147 | 3-$CH_3C_6H_4$ | $CH_3$ | 3,4-di-$CH_3O$ | $CH_2CH_2$ |
| 148 | 2,4,6-$(CH_3)_3C_6H_2$ | $CH_3$ | H | $CH_2CH_2$ |
| 149 | 3-$CH_3C_6H_4$ | $CH_3$ | 4-$CH_3$ | $CH_2CH_2$ |
| 150 | 3-$ClC_6H_4$ | $CH_3$ | 4-$CH_3CONH$ | $CH_2CH_2$ |
| 151 | 3-$ClC_6H_4$ | $CH_3$ | 4-$CH_3$ | $CH_2CH_2$ |
| 152 | 4-$ClC_6H_4$ | $CH_3$ | 3,4-di-$CH_3O$ | $CH_2CH_2$ |
| 153 | 2,4-$(CH_3O)_2$-5-$ClC_6H_2$ | $CH_3$ | H | $CH_2CH_2$ |
| 154 | $C_6H_5$ | $CH_3$ | 2-$CH_3$ | $CH_2CH_2$ |
| 155 | 4-$CH_3C_6H_4$ | $CH_3$ | H | $CH_2CH_2$ |
| 156 | 4-$FC_6H_4$ | $CH_3$ | H | $CH_2CH_2$ |
| 157 | 2-$CH_3OC_6H_4$ | $CH_3$ | 3,4-di-$CH_3O$ | $CH_2CH_2$ |
| 158 | 2-$CH_3OC_6H_4$ | $CH_3$ | 3,4-$OCH_2O$ | $CH_2CH_2$ |
| 159 | $C_6H_5CH_2$ | $CH_3$ | 3,4-di-$CH_3O$ | $CH_2CH_2$ |
| 160 | 4-$FC_6H_4$ | $CH_3$ | 3,4-di-$CH_3O$ | $CH_2CH_2$ |
| 161 | 4-$ClC_6H_4$ | H | H | $CH_2CH_2$ |
| 162 | $C_6H_5CH=CHCH_2$ | H | H | $CH_2CH_2$ |
| 163 | 4-$CH_3C_6H_4$ | H | H | $CH_2CH_2$ |
| 164 | $C_6H_5$ | H | H | $CH_2CH_2$ |
| 165 | 4-$CH_3C_6H_4$ | H | 4-HO | $CH_2CH_2$ |
| 166 | 4-$CH_3C_6H_4$ | H | 4-$CH_3O$ | $CH_2CH_2$ |
| 167 | $C_6H_5$ | H | 3,4-$OCH_2O$ | $CH_2CH_2$ |
| 168 | 4-$CH_3C_6H_4$ | H | 3,4-di-$CH_3O$ | $CH_2CH_2$ |
| 169 | 4-$CH_3C_6H_4$ | H | 4-$C_6H_5CH_2O$ | $CH_2CH_2$ |
| 170 | 4-$CH_3C_6H_4$ | H | 4-$CH_3S$ | $CH_2CH_2$ |
| 171 | $C_6H_5CH_2CH_2$ | H | 4-HO | $CH_2CH_2$ |
| 172 | $C_6H_5$ | H | 3-$CH_3O$ | $CH_2CH_2$ |
| 173 | $C_6H_5$ | H | 4-$CH_3S$ | $CH_2CH_2$ |
| 174 | 3-Cl-4-$CH_3C_6H_3$ | H | H | $CH_2CH_2$ |
| 175 | 4-$CH_3C_6H_4$ | H | 3-$CH_3O$ | $CH_2CH_2$ |
| 176 | 4-$CH_3OC_6H_4$ | H | H | $CH_2CH_2$ |
| 177 | 3-$CH_3C_6H_4$ | H | H | $CH_2CH_2$ |
| 178 | 2-$CH_3C_6H_4$ | H | H | $CH_2CH_2$ |
| 179 | 3-$CH_3C_6H_4$ | H | 3-$CH_3O$ | $CH_2CH_2$ |
| 180 | 4-$CH_3C_6H_4$ | H | 3,4-$OCH_2O$ | $CH_2CH_2$ |
| 181 | $C_6H_5$ | H | H | $(CH_2)_3$ |
| 182 | 2-$CH_3OC_6H_4$ | H | H | $CH_2CH_2$ |
| 183 | 2-$CH_3C_6H_4$ | H | 3,4-di-$CH_3O$ | $CH_2CH_2$ |
| 184 | 3-$CH_3C_6H_4$ | H | 3,4-di-$CH_3O$ | $CH_2CH_2$ |
| 185 | 4-$CH_3OC_6H_4$ | H | 3-$CH_3O$ | $CH_2CH_2$ |
| 186 | 2-$CH_3OC_6H_4$ | H | 3-$CH_3O$ | $CH_2CH_2$ |
| 187 | 4-$CH_3OC_6H_4$ | H | 3,4-di-$CH_3O$ | $CH_2CH_2$ |
| 188 | 2-$CH_3OC_6H_4$ | H | 3,4-$OCH_2O$ | $CH_2CH_2$ |
| 189 | 3-$CH_3C_6H_4$ | H | 3,4-$OCH_2O$ | $CH_2CH_2$ |
| 190 | 2-$CH_3C_6H_4$ | H | 3-$CH_3O$ | $CH_2CH_2$ |
| 191 | 2-$CH_3OC_6H_4$ | H | 3,4-di-$CH_3O$ | $CH_2CH_2$ |
| 192 | 2-$CH_3C_6H_4$ | H | 3,4-$OCH_2O$ | $CH_2CH_2$ |
| 193 | $CH_3$ | $CH_3$ | H | $CH_2CH_2$ |
| 194 | 4-$CH_3OC_6H_4$ | H | 3,4-$OCH_2O$ | $CH_2CH_2$ |
| 195 | $C_6H_5$ | H | 3,4-di-$C_2H_5O$ | $CH_2CH_2$ |
| 196 | $HOCH_2CH_2$ | H | 3,4-di-$CH_3O$ | $CH_2CH_2$ |
| 197 | $C_6H_5$ | H | 4-$CH_3O$ | $CH_2CH_2$ |
| 198 | $C_6H_5$ | H | 3,4-di-$CH_3O$ | $CH_2CH_2$ |
| 199 | 4-$CH_3SC_6H_4$ | H | 3,4-di-$CH_3O$ | $CH_2CH_2$ |
| 200 | 3-$CH_3OC_6H_4$ | H | 3,4-di-$CH_3O$ | $CH_2CH_2$ |
| 201 | 3-$CH_3OC_6H_4$ | H | H | $(CH_2)_4$ |
| 202 | $C_6H_5$ | H | 2-$CH_3O$ | $CH_2CH_2$ |
| 203 | $C_6H_5$ | H | 3,4-$OCH_2O$ | $CH_2CH_2$ |
| 204 | 4-$CH_3OC_6H_4$ | H | 3-$CH_3O$ | $(CH_2)_3$ |
| 205 | $C_6H_5$ | H | 3-$CH_3O$ | $CH_2CH_2$ |
| 206 | $C_6H_5CH_2$ | H | 3,4-di-$CH_3O$ | $CH_2CH_2$ |
| 207 | 2-$C_5H_4N$ | H | 3,4-di-$CH_3O$ | $CH_2CH_2$ |
| 208 | 2-$C_2H_5OC_6H_4$ | H | 3,4-di-$CH_3O$ | $CH_2CH_2$ |
| 209 | 2-$CH_3OC_6H_4$ | H | H | $(CH_2)_3$ |
| 210 | 2-$ClC_6H_4$ | H | 3-$CH_3O$ | $CH_2CH_2$ |
| 211 | $C_6H_5$ | H | H | $CH_2$ |
| 212 | 2-$CH_3OC_6H_4$ | H | 3-$CH_3O$ | $(CH_2)_3$ |
| 213 | $C_6H_5$ | H | 3,4-di-$CH_3O$ | $CH_2$ |
| 214 | 2-$CH_3O$-5-$ClC_6H_3$ | H | 3-$CH_3O$ | $CH_2CH_2$ |
| 215 | 2,6-$(CH_3)_2C_6H_3$ | H | 3-$CH_3O$ | $CH_2CH_2$ |

TABLE 4.—Continued

| | $R_1$ | $R_2$ | Phenyl substit. | Alk |
|---|---|---|---|---|
| Example: | | | | |
| 216 | $C_6H_5$ | H | 3-$CH_3O$-4-$C_2H_5O$ | $CH_2CH_2$ |
| 217 | $C_6H_5$ | H | 3-$CH_3O$ | $CH_2CH_2$ |
| 218 | 2-$C_2H_5OC_6H_4$ | H | 3-$CH_3O$ | $CH_2CH_2$ |
| 219 | 2,6-$(CH_3)_2C_6H_3$ | H | 3,4-di-$CH_3O$ | $CH_2CH_2$ |
| 220 | 2-$C_5H_4N$ | H | H | $CH_2CH_2$ |
| 221 | $C_6H_5$ | $CH_3$ | 3-$CH_3O$ | $CH_2CH_2$ |
| 222 | 3-$CH_3OC_6H_4$ | H | 3-$CH_3O$ | $CH_2CH_2$ |
| 223 | $C_6H_5$ | H | 3,4-$OCH_2CH_2O$ | $CH_2CH_2$ |
| 224 | 2-$CH_3C_6H_4$ | H | H | $(CH_2)_3$ |
| 225 | $C_6H_5$ | H | 3,4-$OCH_2O$ | $(CH_2)_3$ |
| 226 | 2-$ClC_6H_4$ | H | H | $(CH_2)_3$ |
| 227 | 2-$CH_3OC_6H_4$ | $CH_3$ | 3,4-di-$CH_3O$ | $CH_2CH_2$ |
| 228 | 3-$ClC_6H_4$ | H | 3-$CH_3O$ | $CH_2CH_2$ |
| 229 | 3-$CH_3OC_6H_4$ | H | H | $(CH_2)_3$ |
| 230 | 2-$CH_3OC_6H_4$ | H | H | $(CH_2)_4$ |
| 231 | $C_6H_5$ | H | 3-$C_2H_5O$ | $CH_2CH_2$ |
| 232 | $C_6H_5$ | $C_6H_5$ | 3-$CH_3O$ | $CH_2CH_2$ |
| 233 | 2-$CH_3OC_6H_4$ | H | 3,4-di-$C_2H_5O$ | $CH_2CH_2$ |
| 234 | 2-$CH_3C_6H_4$ | $CH_3$ | 3,4-di-$CH_3O$ | $CH_2CH_2$ |
| 235 | 3-$CH_3OC_6H_4$ | H | 3,4-di-$C_2H_5O$ | $CH_2CH_2$ |
| 236 | 2-$C_4H_9OC_6H_4$ | H | 3,4-$OCH_2O$ | $CH_2CH_2$ |
| 237 | 3-$CH_3OC_6H_4$ | $CH_3$ | 3,4-di-$CH_3O$ | $CH_2CH_2$ |
| 238 | 2-$C_5H_4N$ | H | 3,4-$OCH_2O$ | $CH_2CH_2$ |
| 239 | $C_6H_5$ | $CH_3$ | 3-$CH_3$ | $CH_2CH_2$ |
| 240 | 3-$ClC_6H_4$ | H | 3,4-di-$CH_3O$ | $CH_2CH_2$ |
| 241 | 2-$ClC_6H_4$ | H | 3,4-di-$CH_3O$ | $CH_2CH_2$ |
| 242 | $C_6H_5$ | H | 3-Cl | $CH_2CH_2$ |
| 243 | 2-$C_4H_9OC_6H_4$ | H | 3,4-di-$CH_3O$ | $CH_2CH_2$ |
| 244 | $C_6H_5$ | $C_2H_5$ | 3,4-di-$CH_3O$ | $CH_2CH_2$ |
| 245 | 2-$C_2H_5C_6H_4$ | H | 3,4-di-$CH_3O$ | $CH_2CH_2$ |
| 246 | 2,5-$(CH_3O)_2C_6H_3$ | H | 3,4-di-$CH_3O$ | $CH_2CH_2$ |
| 247 | 2-pyrimidyl | H | 3,4-di-$CH_3O$ | $CH_2CH_2$ |
| 248 | $C_6H_5$ | H | 3,4-di-$CH_3O$ | $(CH_2)_3$ |
| 249 | $C_6H_5$ | $CH_3$ | 3,4-di-$C_2H_5O$ | $CH_2CH_2$ |
| 250 | 2-$C_5H_4N$ | H | 3-$CH_3O$ | $CH_2CH_2$ |
| 251 | 2-$CH_3SC_6H_4$ | H | 3,4-di-$CH_3O$ | $CH_2CH_2$ |
| 252 | 2-$CH_3OC_6H_4$ | H | 3,4-di-$CH_3O$ | $(CH_2)_3$ |
| 253 | 3-$CH_3OC_6H_4$ | H | 3,4-di-$CH_3O$ | $(CH_2)_3$ |
| 254 | $C_6H_5$ | $CH_3$ | 3,4-di-$CH_3O$ | $(CH_2)_3$ |
| 255 | 4-$HOC_6H_4$ | $CH_3$ | 3,4-di-$CH_3O$ | $CH_2CH_2$ |
| 256 | $CH_3$ | H | 3-Cl | $CH_2$ |
| 257 | $C_6H_5$ | $CH_3$ | 3-$CH_3$ | $CH_2CH_2$ |
| 258 | $C_6H_5$ | $CH_3$ | 4-$NO_2$ | $CH_2CH_2$ |
| 259 | 2,6-$(CH_3O)_2C_6H_3$ | $CH_3$ | H | $CH_2CH_2$ |
| 260 | 2-$CH_3OC_6H_4$ | $CH_3$ | 4-F | $CH_2CH_2$ |
| 261 | $C_6H_5$ | H | H | $CHCH_3CH_2$ |
| 262 | $C_6H_5$ | $CH_3$ | 4-$NH_2$ | $CH_2CH_2$ |
| 263 | $C_6H_5$ | $CH_3$ | 4-$CH_3CH_2OCONH$ | $CH_2CH_2$ |
| 264 | $C_6H_{11}$ | H | H | $(CH_2)_3$ |
| 265 | $C_6H_{11}$ | H | H | $CH_2CH_2$ |
| 266 | 4-$C_5H_9N$-$CH_3$ | H | H | $(CH_2)_3$ |
| 267 | 4-$C_5H_9N$-$CH_3$ | H | H | $(CH_2)_4$ |
| 268 | $(C_6H_5)_2CH$ | $CH_3$ | 3-$CH_3S$ | $CH_2CH_2$ |
| 269 | 2-pyrazinyl | $CH_3$ | 3-$CH_3SO_2$ | $CH_2CH_2$ |
| 270 | 2-thiazolyl | $CH_3$ | 4-$CF_3$ | $CH_2CH_2$ |
| 271 | 2-(1,3,5-triazinyl) | $CH_3$ | 4-$C_6H_5CH_2$ | $CH_2CH_2$ |
| 272 | 2-thienyl | $CH_3$ | 4-$NH_2SO_2$ | $CH_2CH_2$ |
| 273 | $C_6H_{11}CH_2$ | $CH_3$ | 3-$CH_3COO$ | $CH_2CH_2$ |

Heating the ω-[4-substituted-1-piperazinyl]-loweralkanaldehyde phenylhydrazones, ω-[4-substituted-1-piperazinyl]-lower-alkyl lower-alkyl ketone phenylhydrazones, and ω - [4 - substituted-1-piperazinyl]-lower-alkyl phenyl ketone phenyl-hydrazones of Formula II described above in Examples 118-160 with ethanolic hydrogen chloride, using the manipulative procedure described above in Examples 115-117, affords the 1-[2-(2-methyl-3-indolyl)ethyl]-4-substituted-piperazines described above in Examples 72-114, respectively.

Examples 274-386

Reaction of the ω-[4-substituted-1-piperazinyl]-loweralkanaldehyde phenylhydrazones, ω-[4-substituted-1-piperazinyl]-lower-alkyl lower-alkyl ketone phenylhydrazones, and ω-[4-substituted-1-piperazinyl]-lower-alkyl phenyl ketone phenylhydrazones of Formula II described above in Examples 161-273 with ethanolic hydrogen chloride using the manipulative procedure described above in Examples 115-117, affords the 1-[(3-indolyl)-lower-alkyl]-4-substituted-piperazines of Formula I described, respectively, in Examples 274-386 in Table 5 below, where $R_3$ in each instance is H.

TABLE 5

| | $R_1$ | $R_2$/Indole substit. | Alk | Base or salt | M.P., °C. |
|---|---|---|---|---|---|
| Example: | | | | | |
| 274 | 4$ClC_6H_4$ | H/H | $CH_2CH_2$ | Base | 185.2-186.8 |
| 275 | $C_6H_4CH=CHCH_2$ | H/H | $CH_2CH_2$ | 2HCl | 258.2-263.6 |
| 276 | 4-$CH_3C_6H_4$ | H/H | $CH_2CH_2$ | Base | 147.8-154.8 |
| 277 | $C_6H_4$ | H/H | $CH_2CH_2$ | ----do---- | 131.6-136.0 |
| 278 | 4-$CH_3C_6H_4$ | H/5-HO | $CH_2CH_2$ | ----do---- | 193.2-195.8 |
| 279 | 4-$CH_3C_6H_4$ | H/5-$CH_3O$ | $CH_2CH_2$ | ----do---- | 108.6-111.0 |
| 280 | $C_6H_4$ | H/5,6-$OCH_2O$ | $CH_2CH_2$ | ----do---- | 141.0-,43.2 |
| 281 | 4-$CH_3C_6H_4$ | H/5,6-di-$CH_3O$ | $CH_2CH_2$ | ----do---- | 137.8-139.2 |
| 282 | 4-$CH_3C_6H_4$ | H/5-$C_6H_4CH_2O$ | $CH_2CH_2$ | ----do---- | 151.4-153.6 |
| 283 | 4-$CH_3C_6H_4$ | H/5-$CH_3S$ | $CH_2CH_2$ | ----do---- | 111.0-113.6 |
| 284 | $C_6H_4CH_2CH_2$ | H/5-HO | $CH_2CH_2$ | ----do---- | 198.0-201.6 |
| 285 | $C_6H_4$ | H/6-$CH_3O$ | $CH_2CH_2$ | ----do---- | 137.4-139.6 |
| 286 | $C_6H_4$ | H/5-$CH_3S$ | $CH_2CH_2$ | ----do---- | 110.2-111.6 |
| 287 | 3-Cl-4-$CH_3C_6H_3$ | H/H | $CH_2CH_2$ | ----do---- | 159.2-160.6 |
| 288 | 4-$CH_3C_6H_4$ | H/6-$CH_3O$ | $CH_2CH_2$ | ----do---- | 172.2-173.4 |
| 289 | 4-$CH_3OC_6H_4$ | H/H | $CH_2CH_2$ | ----do---- | 129.8-131.6 |
| 290 | 3-$CH_3C_6H_4$ | H/H | $CH_2CH_2$ | ----do---- | 163.8-_66.2 |
| 291 | 2-$CH_3C_6H_4$ | H/H | $CH_2CH_2$ | ----do---- | 124.2-_26.4 |
| 292 | 3-$CH_3C_6H_4$ | H/6-$CH_3O$ | $CH_2CH_2$ | ----do---- | 119.8-123.4 |
| 293 | 4-$CH_3C_6H_4$ | H/5,6-$OCH_2O$ | $CH_2CH_2$ | ----do---- | 187.2-188.8 |

TABLE 5.—Continued

| Example | R₁ | R₂/Indole substit. | Alk | Base or salt | M.P.,° C. |
|---|---|---|---|---|---|
| 294 | C₆H₄ | H/H | (CH₂)₃ | ----do---- | 126.6–127.8 |
| 295 | 2-CH₃OC₆H₄ | H/H | CH₂CH₂ | ----do---- | 111.4–114.2 |
| 296 | 2-CH₃C₆H₄ | H/5,6-di-CH₃O | CH₂CH₂ | HCl | 218.4–223.4 |
| 297 | 3-CH₃C₆H₄ | H/5,6-di-CH₃O | CH₂CH₂ | Base | 118.4–119.6 |
| 298 | 4-CH₃OC₆H₄ | H/H | CH₂CH₂ | ----do---- | 185.6–188.6 |
| 299 | 2-CH₃OC₆H₄ | H/6-CH₃O | CH₂CH₂ | ----do---- | 98.2–100.2 |
| 300 | 4-CH₃OC₆H₄ | H/5,6-di-CH₃O | CH₂CH₂ | ----do---- | 158.8–164.0 |
| 301 | 2-CH₃OC₆H₄ | H/5,6-OCH₂O | CH₂CH₂ | ----do---- | 158.0–159.4 |
| 302 | 3-CH₃C₆H₄ | H/5,6-OCH₂O | CH₂CH₂ | ----do---- | 130.0–131.4 |
| 303 | 2-CH₃C₆H₄ | H/6-CH₃O | CH₂CH₂ | ----do---- | 139.2–141.4 |
| 304 | 2-CH₃OC₆H₄ | H/5,6-di-CH₃O | CH₂CH₃ | ----do---- | 116.0–116.6 |
| 305 | 2-CH₃C₆H₄ | H/5,6-OCH₂O | CH₂CH₂ | ----do---- | 159.2–160.8 |
| 306 | CH₃ | H/H | CH₂CH₂ | 2HCl | 279.0–283.8 |
| 307 | 4-CH₃OC₆H₄ | CH/5,6-OCH₂O | CH₂CH₂ | Base | 160.8–162.8 |
| 308 | C₆H₄ | H/5,6-di-C₂H₄O | CH₂CH₂ | ----do---- | 123.0–125.2 |
| 309 | HOCH₂CH₂ | H/H | CH₂CH₂ | 2HCl | 266.8–271.4 |
| 310 | C₆H₄ | H/5-6,di-CH₃O | CH₂CH₂ | Base | 128.4–130.0 |
| 311 | C₆H₄ | H/5-CH₃O | CH₂CH₂ | ----do---- | 147.4–150.0 |
| 312 | 4-CH₃SC₆H₄ | H/5,6-di-CH₃O | CH₂CH₂ | ----do---- | 175.4–177.2 |
| 313 | 3-CH₃C₆H₄ | H/5,6-di-CH₃O | CH₂CH₂ | ----do---- | 123.0–124.0 |
| 314 | 3-CH₃OC₆H₄ | H/H | CH₂CH₂ | ----do---- | 146.4–147.6 |
| 315 | C₆H₄ | H/H | (CH₂)₄ | ----do---- | 96.0–100.8 |
| 316 | C₆H₄ | H/7-CH₃O | CH₂CH₂ | ----do---- | 122.0–125.2 |
| 317 | 4-CH₃OC₆H₄ | H/5,6-OCH₂O | CH₂CH₂ | ----do---- | 182.4–184.6 |
| 318 | C₆H₄ | H/6-CH₃O | (CH₂)₃ | ----do---- | 196.4–197.6 |
| 319 | C₆H₄CH₂ | H/5,6-di-CH₃O | CH₂CH₂ | ----do---- | 113.0–114.4 |
| 320 | 2-C₄H₃N | H/5,6-di-CH₃O | CH₂CH₂ | HCl | 210.2–211.8 |
| 321 | 2-C₂H₄OC₆H₄ | H/5,6-di-CH₃O | CH₂CH₂ | Base | 120.4–122.0 |
| 322 | 2-CH₃OC₆H₄ | H/H | (CH₂)₃ | ----do---- | 156.8–159.2 |
| 323 | 2-ClC₆H₄ | H/6-CH₃O | CH₂CH₂ | ----do---- | 125.2–128.8 |
| 324 | C₆H₄ | H/H | CH₂ | ----do---- | 184.6–186.8 |
| 325 | 2-CH₃OC₆H₄ | H/H | (CH₂)₃ | ----do---- | 153.2–155.0 |
| 325 | C₆H₄ | H/5,6-di-CH₃O | CH₂ | ----do---- | 159.2–160.2 |
| 327 | 2-CH₃O-5-ClC₆H₃ | H/6-CH₃O | CH₂CH₂ | ----do---- | 12..8–128.6 |
| 328 | 2,6-(CH₃)₂C₆H₃ | H/6-CH₃O | CH₂CH₂ | ----do---- | 135.2–136.8 |
| 329 | C₆H₅ | H/5-C₂H₅O-6-CH₃O | CH₂CH₂ | ----do---- | 129.2–130.6 |
| 330 | C₆H₅ | H/4-CH₃O | CH₂CH₂ | ----do---- | 177.2–182.0 |
| 331 | 2-C₂H₄OC₆H₄ | H/6-CH₃O | CH₂CH₂ | ----do---- | 159.4–161.4 |
| 332 | 2,6-(CH₃)₂C₆H₃ | H/5,6-di-CH₃O | CH₂CH₂ | ----do---- | 117.8–119.6 |
| 333 | 2-C₄H₃N | H/H | CH₂CH₂ | HCl | 232.2–234.4 |
| 334 | C₆H₄ | CH₃/6-CH₃O | CH₂CH₂ | HCl | 253.2–256.2 |
| 335 | 3-CH₃OC₆H₄ | H/6-CH₃O | CH₂CH₂ | Base | 142.0–144.6 |
| 336 | C₆H₄ | H/5,6-OCH₂CH₂O | CH₂CH₂ | ----do---- | 170.8–176.8 |
| 337 | 2-CH₃C₆H₄ | H/H | (CH₂)₃ | ----do---- | 102.4–104.2 |
| 338 | C₆H₄ | H/5,6-OCH₂O | (CH₂)₃ | ----do---- | 142.6–144.2 |
| 339 | 2-ClC₆H₄ | H/H | (CH₂)₃ | ----do---- | 140.8–143.6 |
| 340 | 2-CH₃OC₆H₄ | CH₃/5,6-di-CH₃O | CH₂CH₂ | ----do---- | 217.4–220.8 |
| 341 | 3-ClC₆H₄ | H/6-CH₃O | CH₂CH₂ | ----do---- | 103.6–104.4 |
| 342 | 3-CH₃OC₆H₄ | H/H | (CH₂)₄ | HCl | 234.2–235.8 |
| 343 | 2-CH₃OC₆H₄ | H/H | (CH₂)₄ | Base | 120.6–123.8 |
| 344 | C₆H₄ | H/6-C₂H₅O | CH₂CH₂ | ----do---- | 159.6–163.2 |
| 345 | C₆H₄ | C₆H₄/6-CH₃O | CH₂CH₂ | ----do---- | 148.2–148.8 |
| 346 | 2-CH₃OC₆H₄ | H/5,6-di-C₂H₄O | CH₂CH₂ | ----do---- | 89.4–92.0 |
| 347 | 2-CH₃C₆H₄ | CH₃/5,6-di-CH₃O | CH₂CH₂ | ----do---- | 119.8–121.6 |
| 348 | 3-CH₃OC₆H₄ | H/5,6-di-C₂H₄O | CH₂CH₂ | ----do---- | 97.6–98.4 |
| 349 | 2-C₄H⁹OC₆H₄ | H/5,6-OCH₂O | CH₂CH₂ | ----do---- | 125–126.4 |
| 350 | 3-CH₃OC₆H₄ | CH₃/5,6-di-CH₃O | CH₂CH₂ | 2HCl | 182.6–184.2 |
| 351 | 2-C₄H₃N | H/5,6-OCH₂O | CH₂CH₂ | 2HCl | 200–224 |
| 352 | C₆H₄ | H/6-CH₃ | CH₂CH₂ | Base | 174.2–175.2 |
| 353 | 3-ClC₆H₄ | H/5,6-di-CH₃O | CH₂CH₂ | HCl | 236.8–239.2 |
| 354 | 2-ClC₆H₄ | H/5,6-di-CH₃O | CH₂CH₂ | Base | 86.8–89.8 |
| 355 | C₆H₄ | H/6-Cl | CH₂CH₂ | ----do---- | 177.2–178.6 |
| 356 | 2-C₄H⁹OC₆H₄ | H/5,6-di-CH₃O | CH₂CH₂ | ----do---- | 93.8–95.8 |
| 357 | C₆H₄ | C₂H₄/5,6-di-CH₃O | CH₂CH₂ | HCl | 237.6–239.0 |
| 358 | 2-C₂H₄C₆H₄ | H/5,6-di-CH₃O | CH₂CH₂ | Base | 104.2–107.2 |
| 359 | 2,5-(CH₃O)₂C₆H₃ | H/5,6-di-CH₃O | CH₂CH₂ | ----do---- | 136.8–137.8 |
| 360 | 2-pyrimidyl | H/5,6-di-CH₃O | (CH₂)₃ | ----do---- | 127.2–128.2 |
| 361 | C₆H₄ | H/5,6-di-CH₃O | CH₂CH₂ | ----do---- | 157.4–158.2 |
| 362 | C₆H₄ | CH₃/5,6-di-C₂H₅O | CH₂CH₂ | ----do---- | 111.6–113.2 |
| 363 | 2-C₄H₃N | H/6-CH₃O | CH₂CH₂ | ----do---- | 107.2–108.2 |
| 364 | 2-CH₃SC₆H₄ | H/5,6-di-CH₃O | CH₂CH₂ | ----do---- | 116.0–117.8 |
| 365 | 2-CH₃OC₆H₄ | H/5,6-di-CH₃O | (CH₂)₃ | ----do---- | 120.4–121.4 |
| 366 | 3-CH₃OC₆H₄ | H/5,6-di-CH₃O | (CH₂)₃ | ----do---- | 159.0–160.2 |
| 367 | C₆H₄ | CH₃/5,6-di-CH₃O | (CH₂)₃ | ----do---- | 117.8–118.8 |
| 368 | 4-HOC₆H₄ | CH₃/5,6-di-CH₃O | CH₂CH₂ | ----do---- | 136.0–142.0 |
| 369 | CH₃ | H/4-Cl | CH₂ | ----do---- | 152.0–156.0 |
| 370 | C₆H₄ | CH₃/6-CH₃ | CH₂CH₂ | HCl | 245.0–245.8 |
| 371 | C₆H₄ | CH₃/5-NO₂ | CH₂CH₂ | HCl | 269.0–270.0 |
| 372 | 2,6-(CH₃O)₂C₆H₃ | CH₃/H | CH₂CH₂ | Base | 152.0–153.2 |
| 373 | 2-CH₃OC₆H₄ | CH₃/5-F | CH₂CH₂ | ----do---- | 135.0–137.0 |
| 374 | C₆H₄ | H/H | CHCH₃CH₂ | ----do---- | 193.0–195.0 |
| 375 | C₆H₄ | CH₃/5-NH₂ | CH₂CH₂ | ----do---- | 152.4–154.0 |
| 376 | C₆H₄ | CH₃/5-C₂H₅OCONH | CH₂CH₂ | p-tosylate | 199.0–201.0 |
| 377 | C₅H₁₁ | H/H | (CH₂)₃ | Base | 132.0–133.0 |
| 378 | C₅H₁₁ | H/H | CH₂CH₂ | ----do---- | 153.0–154.0 |
| 379 | 4-C₅H₉N-CH₃ | H/H | (CH₂)₃ | ----do---- | 132.2–135.5 |
| 380 | 4-C₅H₉N-CH₃ | H/H | (CH₂)₄ | ----do---- | 125.0–126.2 |
| 381 | (C₆H₅)₂CH | CH₃/6-CH₃S | CH₂CH₂ | | |
| 382 | 2-pyrazinyl | CH₃/6-CH₃SO₂ | CH₂CH₂ | | |
| 383 | 2-thiazolyl | CH₃/5-CF₃ | CH₂CH₂ | | |
| 384 | 2-(1,3,5-triazinyl) | CH₃/5-C₆H₅CH₂ | CH₂CH₂ | | |
| 385 | 2-thienyl | CH₃/5-NH₂SO₂ | CH₂CH₂ | | |
| 386 | C₅H₁₁CH₂ | CH₃/6-CH₃COO | CH₂CH₂ | | |

Examples 387–393

By reacting an appropriate phenylhydrazine of Formula III with an appropriate ω-(4-substituted-1-piperazinyl) aldehyde or ω-(4-substituted-1-piperazinyl)-lower-alkanone of Formula IV under the conditions described in Examples 115–117, there can be obtained the 4-[4-phenyl-1-piperazinyl]butyraldehyde phenylhydrazones or 3-[4-phenyl-1-piperazinyl]propyl methyl ketone phenylhydrazones of Formula II listed in Table 6 below, where in each case, Alk is $CH_2CH_2$.

TABLE 6

| | $R_1$ | $R_2$ | Phenyl substit. | $R_3$ |
|---|---|---|---|---|
| Example: | | | | |
| 387 | $C_6H_5$ | H | H | $CH_3$ |
| 388 | 2-$CH_3OC_6H_4$ | $CH_3$ | 5,6-$OCH_2O$ | $C_6H_5CH_2$ |
| 389 | 2-$CH_3OC_6H_4$ | $CH_3$ | 5,6-$OCH_2O$ | $CH_3$ |
| 390 | 2-$CH_3OC_6H_4$ | H | 5,6-$OCH_2O$ | $CH_3$ |
| 391 | 2-$CH_3OC_6H_4$ | H | H | $CH_3$ |
| 392 | 2-$CH_3OC_6H_4$ | $CH_3$ | 5-$NH_2$ | H |
| 393 | $C_6H_5$ | $CH_3$ | 5-$NH_2$ | H |

Examples 394–400

Reaction of the 4-[4-phenyl-1-piperazinyl]butyraldehyde phenylhydrazones or 3-[4-phenyl-1-piperazinyl]propyl methyl ketone phenylhydrazones of Formula II described above in Examples 387–393 with ethanolic hydrogen chloride, using the manipulative procedure described above in Examples 115–117, affords the 1-[2-(3-indolyl)ethyl]-4-phenylpiperazines of Formula I described, respectively, in Examples 394–400 in Table 7 below, where in each case, Alk is $CH_2CH_2$. All compounds were isolated as the free bases.

TABLE 7

| | $R_1/R_2$ | Indole subst./$R_3$ | M.P., ° C. |
|---|---|---|---|
| Example: | | | |
| 394 | $C_6H_5$/H | H/$CH_3$ | 93.8–95.6 |
| 395 | 2-$CH_3OC_6H_4$/$CH_3$ | 5,6-$OCH_2O$/$C_6H_5CH_2$ | 169.2–170.2 |
| 396 | 2-$CH_3OC_6H_4$/$CH_3$ | 5,6-$OCH_2O$/$CH_3$ | 118.2–119.6 |
| 397 | 2-$CH_3OC_6H_4$/H | 5,6-$OCH_2O$/$CH_3$ | 155.4–156.4 |
| 398 | 2-$CH_3OC_6H_4$/H | H/$CH_3$ | 74.6–76.4 |
| 399 | 2-$CH_3OC_6H_4$/$CH_3$ | 5-$NH_2$/H | |
| 400 | $C_6H_5$/$CH_3$ | 5-$NH_2$/H | 150–151.8 |

Examples 401–403

Reaction of 5-chloro-2-pentanone with 1-(1-methyl-3-pyrrolidyl)piperazine; 1-[2-(N-morpholinyl)ethyl]piperazine; or 1-[2-(N,N-dimethylamino)ethyl]piperazine in the presence of anhydrous sodium carbonate according to the manipulative procedure described above in Example 1, affords, respectively, 1-(3-acetylpropyl)-4-(1-methyl-3-pyrrolidyl)piperazine; 1 - (3 - acetylpropyl)-4-[2-(N-morpholinyl)ethyl]piperazine; or 1-(3-acetylpropyl-4-[2-(N,N-dimethylamino)ethyl]piperazine.

Reaction of each of the latter with phenylhydrazine in the presence of alcoholic hydrogen chloride according to the manipulative procedure described above in Example 71, affords, respectively, 1-[2-(2-methyl-3-indolyl)ethyl]-4-(1-methyl-3-pyrrolidyl)piperazine; 1-[2-(2 - methyl - 3-indolyl)ethyl]-4-[2 - (N - morpholinyl)ethyl]piperazine; or 1-[2-(2-methyl-3-indolyl)-ethyl]-4-[2-(N,N-dimethylamino)ethyl]piperazine.

I claim:
1. A compound having the formula

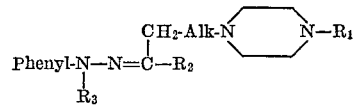

where $R_1$ is lower-alkyl, hydroxy-lower-alkyl, phenyl, phenyl-lower-alkyl, benzhydryl, cinnamyl, cycloalkyl, cycloalkyl-lower-alkyl, piperidyl, pyrrolidyl, morpholinyl-lower-alkyl, di-lower-alkylamino-lower-alkyl, pyrimidyl, pyrazinyl, pyridyl, thiazolyl, 1,3,5-triazinyl, or thienyl; $R_2$ is hydrogen, lower-alkyl, or phenyl; $R_3$ is hydrogen, lower-alkyl, or phenyl-lower-alkyl; and Alk is lower-alkylene containing from one to seven carbon atoms.

2. A compound according to claim 1 wherein $R_1$ is phenyl; $R_2$ is lower-alkyl; and $R_3$ is hydrogen.

3. A compound according to claim 1 wherein $R_1$ is phenyl; and $R_2$ and $R_3$ are hydrogen.

4. 3-(4-phenyl-1-piperazinyl)propyl methyl ketone 3,4-dimethoxyphenylhydrazone according to claim 2 wherein $R_1$ as phenyl is unsubstituted; $R_2$ is methyl; phenyl bears a 3,4-dimethoxy substituent; and Alk is 1,2-ethylene.

5. 3-[4-(4-fluorophenyl)-1-piperazinyl]propyl methyl ketone phenylhydrazone according to claim 2 wherein $R_1$ as phenyl bears a 4-fluoro substituent; $R_2$ is methyl; phenyl is unsubstituted; and Alk is 1,2-ethylene.

6. 3 - [4 - (3 - chlorophenyl) - 1 - piperazinyl]propyl methyl ketone phenylhydrazone according to claim 2 wherein $R_1$ as phenyl bears a 3-chloro substituent; $R_2$ is methyl; phenyl is unsubstituted; and Alk is 1,2-ethylene.

7. 3-(4-phenyl-1-piperazinyl)propyl methyl ketone 4-acetylaminophenylhydrazone according to claim 2 wherein $R_1$ as phenyl is unsubstituted; $R_2$ is methyl; phenyl bears a 4-acetyl-amino substituent; and Alk is 1,2-ethylene.

8. 3-[4-(4-chlorophenyl)-1-piperazinyl]propyl methyl ketone phenylhydrazone according to claim 2 wherein $R_1$ as phenyl bears a 4-chloro substituent; $R_2$ is methyl; phenyl is unsubstituted; and Alk is 1,2-ethylene.

9. 3-[4-(4-chlorophenyl)-1-piperazinyl]propyl methyl ketone 4-acetylaminophenylhydrazone according to claim 2 wherein $R_1$ as phenyl bears a 4-chloro substituent; $R_2$ is methyl; phenyl bears a 4-acetylamino substituent; and Alk is 1,2-ethylene.

10. 3-[4-(3-chlorophenyl)-1-piperazinyl]propyl methyl ketone 4-acetylaminophenylhydrazone according to claim 2 wherein $R_1$ as phenyl bears a 3-chloro substituent; $R_2$ is methyl; phenyl bears a 4-acetylamino substituent; and Alk is 1,2-ethylene.

11. 3-[4-(4-fluorophenyl)-1-piperazinyl]propyl methyl ketone phenylhydrazone according to claim 2 wherein $R_1$ as phenyl bears a 4-fluoro substituent; $R_2$ is methyl; phenyl is unsubstituted; and Alk is 1,2-ethylene.

12. 3-(4-phenyl-1-piperazinyl)propyl methyl ketone 4-aminophenylhydrazone according to claim 2 wherein $R_1$ as phenyl is unsubstituted; $R_2$ is methyl; phenyl bears a 4-amino substituent; and Alk is 1,2-ethylene.

13. 3-(4-phenyl-1-piperazinyl)propyl methyl ketone 4-ethoxycarbonylaminophenylhydrazone according to claim 2 wherein $R_1$ as phenyl is unsubstituted; $R_2$ is methyl; phenyl bears a 4-ethoxycarbonylamino substituent; and Alk is 1,2-ethylene.

14. 3-[4-(2-methoxyphenyl) - 1 - piperazinyl]propyl methyl ketone 4-fluorophenylhydrazone according to claim 2 wherein $R_1$ as phenyl bears a 2-methoxy substituent; $R_2$ is methyl; phenyl bears a 4-fluoro substituent; and Alk is 1,2-ethylene.

15. 3-(4-phenyl-1-piperazinyl)propyl methyl ketone 4-nitrophenylhydrazone according to claim 2 wherein $R_1$ as phenyl is unsubstituted; $R_2$ is methyl; phenyl bears a 4-nitro substituent; and Alk is 1,2-ethylene.

16. 3-methyl-4-(4 - phenyl-1-piperazinyl)butyraldehyde phenylhydrazone according to claim 3 wherein $R_1$ as phenyl and phenyl are unsubstituted; and Alk is $CHCH_3CH_2$.

References Cited

UNITED STATES PATENTS

| | | | |
|---|---|---|---|
| 3,014,043 | 12/1961 | Gaines et al. | 260—566 XR |
| 3,146,234 | 8/1964 | Archer | 260—268 |
| 3,328,407 | 6/1967 | Archer | 260—268 |

OTHER REFERENCES

Elderfield, Heterocyclic Compounds, vol. 3, pp. 8–9, John Wiley and Sons, New York (1952).

JOHN D. RANDOLPH, Primary Examiner

U.S. Cl. X.R.

260—247.1, 247.2, 247.5, 249.5, 251, 999

PO-1050
(5/69)

UNITED STATES PATENT OFFICE
CERTIFICATE OF CORRECTION

Patent No. 3,468,882         Dated September 23, 1969

Inventor(s) Stanley C. Laskowski

It is certified that error appears in the above-identified patent and that said Letters Patent are hereby corrected as shown below:

Column 2, lines 50-55, that part of the formula reading "Phenyl=N-N" should read --Phenyl-N-N--. Column 3, lines 5-25, Formula II should show instead --

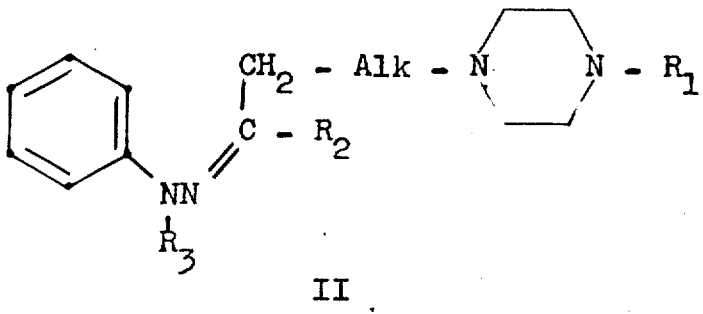

II

Column 4, line 64, "evalution" should read --evaluation--.
Column 6, line 13, Example 27, "(CH )$_{22}$" should read --(CH$_2$)$_2$--;
line 52, "thiry" should read --thirty--. Columns 7 and 8,
Example 111, "Hemi-ratartrate" should read --hemi-tartrate--.
Column 12, Example 275, "C$_6$H$_4$CH=CHCH$_2$" should read --C$_6$H$_5$CH=CHCH
Examples 277, 280, 285, and 286, "C$_6$H$_4$" should read in each
instance --C$_6$H$_5$--; Example 280, "141.0-,43.2°C." should read
--141.0-143.2°C.--; Example 282, "H/5-C$_6$H$_4$CH$_2$O" should read
--H/5-C$_6$H$_5$CH$_2$O--; and Example 284, "C$_6$H$_4$CH$_2$CH$_2$" should read
--C$_6$H$_5$CH$_2$CH$_2$--. Column 13, Examples 294, 308, 310, 311, 315,
316, 318, 324, 326, 334, 336, 338, 344, 345, 352, 355, 357, 361,
362, 367, 370, 371, 374, 375, and 376, "C$_6$H$_4$" should read in
each instance, --C$_6$H$_5$--; Example 307, "CH/5,6-OCH$_2$O" should
read --CH$_3$/5,6-OCH$_2$O--; Examples 308 and 346, "H/5,6-di-C$_2$H$_4$O"
should read in each instance, --H/5,6-di-C$_2$H$_5$O--; Example
319, "C$_6$H$_4$CH$_2$" should read --C$_6$H$_5$CH$_2$--; Examples 320, 333, 351,
and 363, "2-C$_4$H$_4$N" should read in each instance --2-C$_5$H$_4$N--;
Examples 321 and 331, "2-C$_2$H$_4$OC$_6$H$_4$" should read in each instance
--2-C$_2$H$_5$OC$_6$H$_4$--; the second of the two examples numbered "325"

PO-1050
(5/69)

UNITED STATES PATENT OFFICE
CERTIFICATE OF CORRECTION

Patent No. 3,468,882               Dated September 23, 1969

Inventor(s) Stanley C. Laskowski          PAGE 2

It is certified that error appears in the above-identified patent and that said Letters Patent are hereby corrected as shown below:

should be renumbered --326--; Columns 13 and 14, Example 327, "12 .8-128.6°C." should read --121.8-128.6°C.--; Example 330, "177.2-182.0°C." should read --177.2-182.2°C.--; Column 13, Examples 345, "$C_6H_4/6-CH_3O$" should read --$C_6H_5/6-CH_3O$--; Example 348, "$H/5,6-di-C_3H_4O$" should read --$H/5,6-di-C_2H_5O$--; Example 357, "$C_2H_4/5,6-di-CH_3O$" should read --$C_2H_5/5,6-di-CH_3$ Example 358, "$2-C_2H_4C_6H_4$" should read --$2-C_2H_5C_6H_4$--; Columns 13 and 14, Example 368, "$CH_3CH_2$" should read --$CH_2CH_2$--. Column 15, line 65, "(3-acetylpropyl-4-" should read --(3-acetylpropyl)-4- --.

SIGNED AND
SEALED
JUN 16 1970

(SEAL)
Attest:

Edward M. Fletcher, Jr.
Attesting Officer

WILLIAM E. SCHUYLER
Commissioner of Pat